Figure 2:
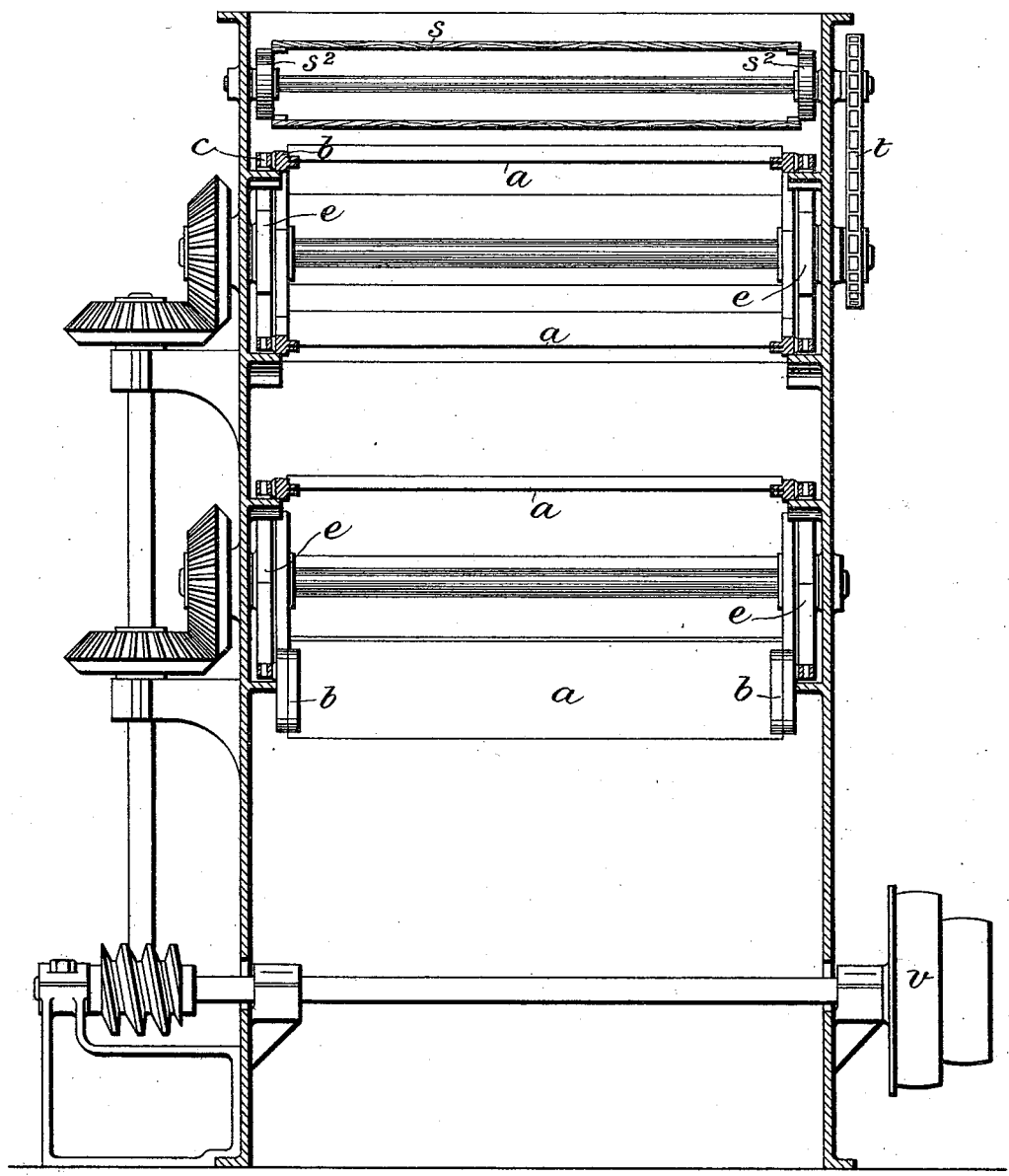

(No Model.) 4 Sheets—Sheet 1.
S. C. DAVIDSON.
DRYING APPARATUS.
No. 538,728. Patented May 7, 1895.
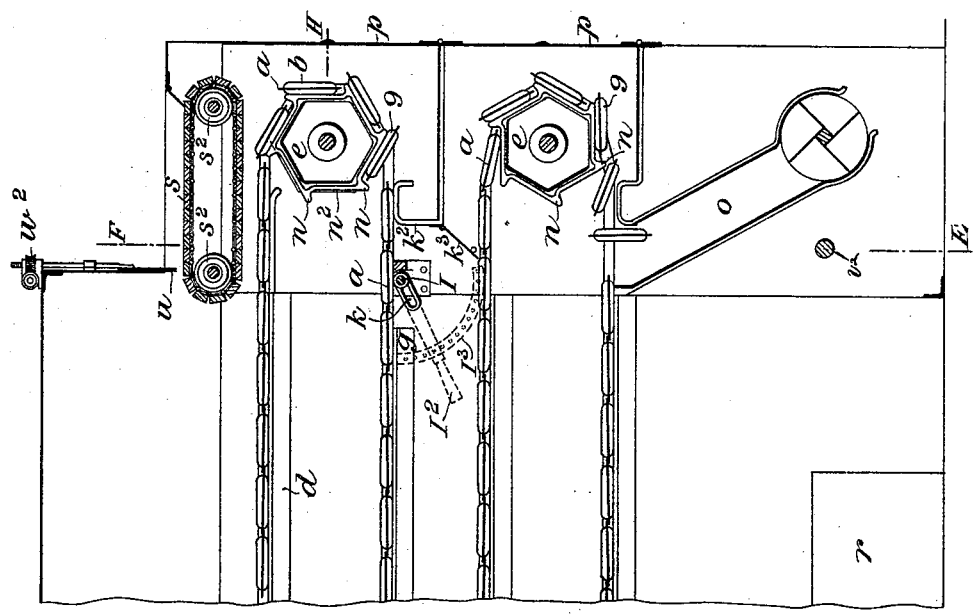
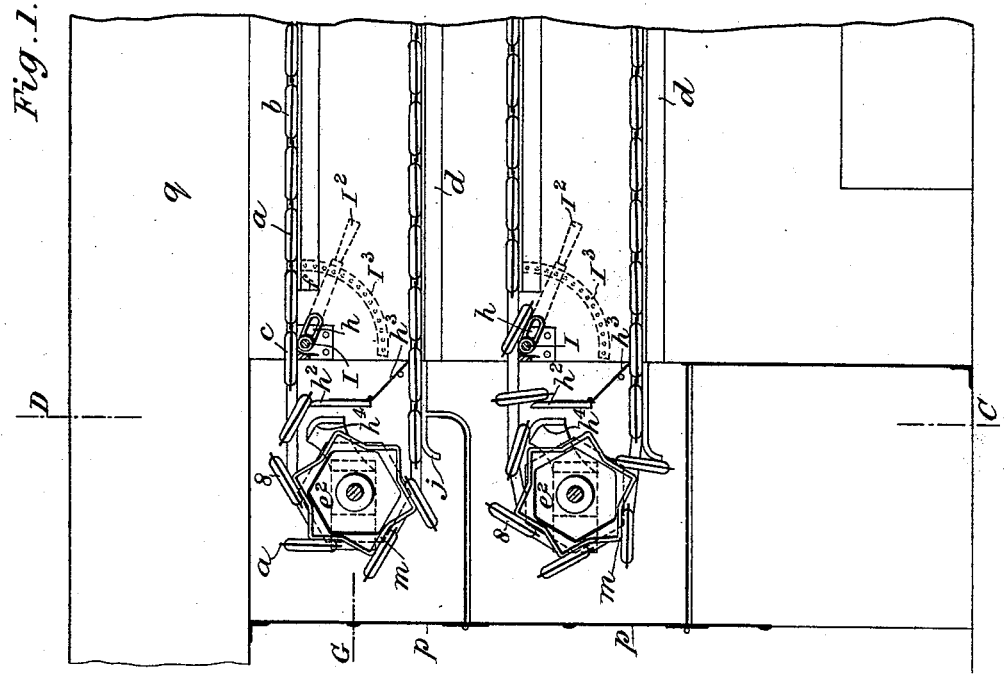
Fig. 1.
WITNESSES:
Fred White
Thomas F. Wallace
INVENTOR:
Samuel Cleland Davidson,
By his Attorneys:

(No Model.) 4 Sheets—Sheet 3.
S. C. DAVIDSON.
DRYING APPARATUS.

No. 538,728. Patented May 7, 1895.

WITNESSES:
Fred White
Thomas F. Wallace

INVENTOR:
Samuel Cleland Davidson,
By his Attorneys (No Model.) 4 Sheets—Sheet 4.
S. C. DAVIDSON.
DRYING APPARATUS.
No. 538,728. Patented May 7, 1895.
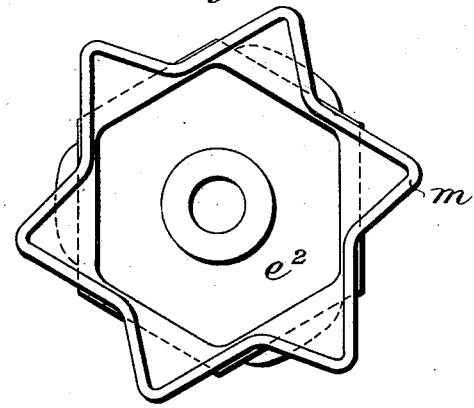
Fig. 4.
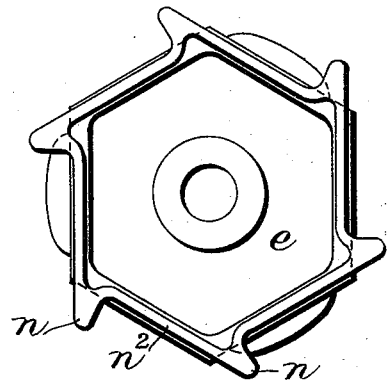
Fig. 6.
Fig. 5.
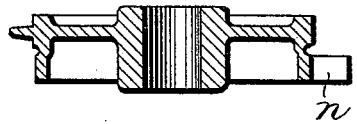
Fig. 6.ª
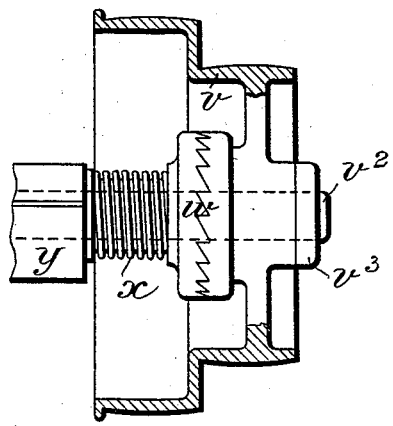
Fig. 7.
WITNESSES:
Fred White
Thomas H Wallace
INVENTOR
Samuel Cleland Davidson,
By his Attorneys

UNITED STATES PATENT OFFICE.

SAMUEL CLELAND DAVIDSON, OF BELFAST, IRELAND.

DRYING APPARATUS.

SPECIFICATION forming part of Letters Patent No. 538,728, dated May 7, 1895.

Application filed December 24, 1894. Serial No. 532,826. (No model.)

*To all whom it may concern:*

Be it known that I, SAMUEL CLELAND DAVIDSON, a subject of the Queen of Great Britain, residing at Belfast, Ireland, have invented certain new and useful improvements in apparatus for exposing tea, coffee, cocoa, grain, and other substances to the drying or other action of air, vapor, or gases, of which the following is a specification.

The apparatus for exposing tea, coffee, cocoa, grain and other substances to the drying or other action of air, vapor or gases to which my invention relates is of the type in which tilting trays on endless bands or chains are employed, the edges of which tilting trays overlap one another when the trays are horizontally in line so as to form a continuous web upon which the material is carried, for drying or other purposes. An apparatus of this type is described in the specification of my English Patent No. 2,046 of 1892.

One object of the present invention is to more efficiently effect the reversal of the overlap of the edges of the said trays than as hitherto effected in their passage from the top surface of an endless web formed by them to the lower surface of same, and vice versa, which reversal of overlap is necessary in order that the trays may tilt free of one another, so as to drop the material at the end of both the upper and lower stretches of said endless webs.

The method described in the specification of my English patent already mentioned for effecting the reversal of the overlap of the trays when passing round the sprocket wheels on which the endless webs are mounted, has since been found in practical working occasionally liable to derangement, from springs or other obstacles getting in with the material to be dried, and becoming entangled with or otherwise preventing the trays at the place where they swing down and effect their change of overlap by side guides and gravitation, from properly accomplishing the passing of their edges from the correct overlap for the top surface to that for the lower one; but by the present invention this objection is entirely overcome.

Another object of the present invention is to effect a more even distribution of the material when discharged by the trays onto the surface of the endless webs below, which receive same.

My invention consists first in the combination with the endless chains, the tilting trays carried thereby and the sprocket wheels around which the chains pass at each end of their travel, of moving or revolving projecting ledges either on said sprocket wheels or on other wheels carried by and rotating with the sprocket wheel shafts, which projecting ledges as they revolve with the corresponding wheel successively engage the successive trays or attachments on said trays after they have discharged their contents and before they are led around the sprocket wheel and cause the trailing edge of each tray to be projected above the leading edge of the next following tray and retained in that position while passing round with the sprocket wheel whereby it again comes underneath the leading edge of the following tray when the conveying chain carries it from the sprocket wheel to the next horizontal stretch or surface of the endless web; secondly, in the combination of two or more stops near the end of each horizontal stretch of the endless web for the tilting trays to strike against when they drop on their pivots, the first stop allowing the trays to drop only to an inclined position and the last stop allowing them to drop to the vertical position, the trays being raised to the horizontal position or practically so before each drop after the first; thirdly, in the combination with the stops against which the tilting trays strike when they drop of means for regulating the position of said stops and consequently the angle to which said trays drop.

The apparatus is more particularly applicable for drying purposes but may also be employed for other purposes for which substances are exposed to the action of air, vapor or gases.

Figure 3:
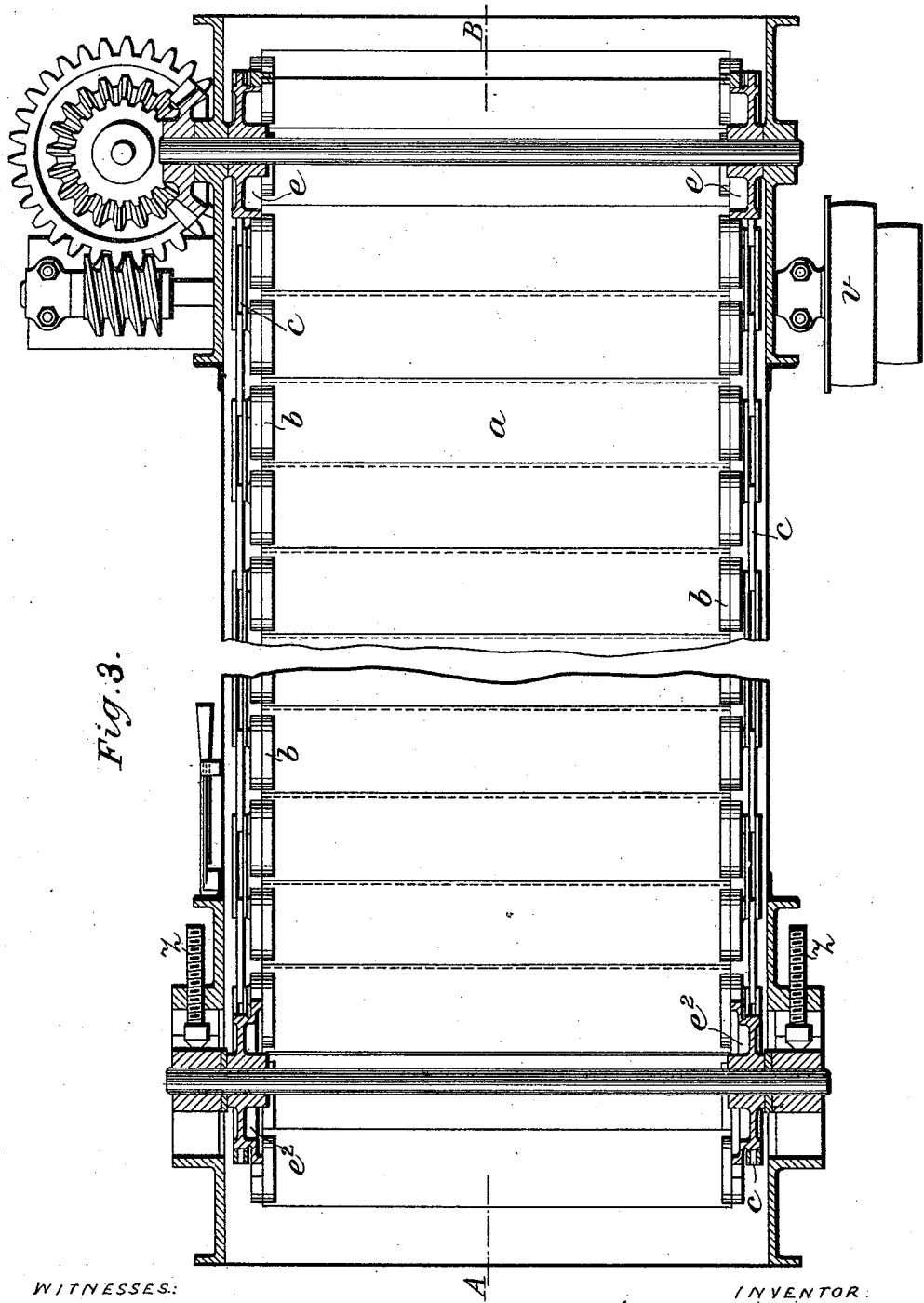

In the accompanying drawings, Figure 1 is a longitudinal vertical section, on the line A B of Fig. 3, of an apparatus constructed in accordance with this invention and adapted for drying tea or other substances. Fig. 2 is a transverse section on the line E F of Fig. 1. Fig. 3 is a horizontal section on the line G H of Fig. 1. Figs. 4 and 5 are respectively an elevation and a section of the sprocket-wheel $e^2$. Figs. 6 and $6^a$ are respectively an elevation and a section of the sprocket-wheel e. Fig. 7 is a view of the driving-pulley, showing a spring safety-clutch to prevent the machine being accidentally driven in a reverse direction. Figs. 2 and 3 are on a somewhat larger scale than Fig. 1, and Figs. 4, 5, 6, 6ª, and 7 are on a larger scale than Figs. 2 and 3.

a a are transverse flat trays attached at their ends by holders b b, which are pivoted on endless chains c c, the pivots being so placed in an intermediate position between the leading edge of the trays and the center that they will drop into a vertical position when unsupported. The holders b b and endless chains c c travel along and are supported by rails or bars d d and the chains pass round and are returned by the sprocket wheel e at the driving end, and $e^2$ at the opposite end. The sprocket wheels at one end of the machine are shown as driven by a combination of worm and bevel gear, but any other suitable means of driving them may be adopted. At the point f the upper rails are so discontinued that they no longer support the ends of the trays, and therefore allow the trays to drop, and at the point g the lower rails are discontinued with the same object.

On reference to the figures, it will be seen that the leading edge of each tray in the horizontal stretches of the endless webs, overlaps the trailing or rear edge of the preceding tray, and that each tray is free to drop on its pivots when the support of the rails d d ceases at f or g on the upper or lower stretches respectively.

Each tray on passing the point f drops downward from the horizontal position and strikes against the stop h which is capable of being so adjusted that the tray on striking it only drops to a sufficient angle to partially discharge its load of material upon the trays below. The stop h is carried upon a spindle I and is regulated by a handle $I^2$ outside the machine, and which is held in position by a pinching screw or pins in the quadrant $I^3$ and the range of its adjustment is such that the tray may be allowed to drop to any required angle between the horizontal and vertical, as different materials and also the same material in its different degrees of dampness, in passing through the machine, require different adjustments of the angle for this partial discharge; and in order that the adjustable stops may be set correctly, a glass door may be provided, preferably in side of the machine, so that the discharge may be observed, while the machine is working. After the tray has passed over the stop h it drops (in the arrangement illustrated in which there are only two stops h and $h^2$) to a vertical position against the stop $h^2$ with sufficient force to shake off the remainder of the material. By thus only partially discharging the contents of the trays at the first drop the material is more equally distributed over the trays below than if it were all dropped at one time, and the remainder of the material which is discharged at the second drop of the tray falls on a hinged flap or apron $h^3$ attached to the stop $h^2$, off which it slides down upon the under or returning trays of the endless webs, and thus further assists the even spreading of the material thereon. The tray after traveling clear of the stop $h^2$, then comes against the stop $h^4$ which is attached to and moves with the movable bearing of the sprocket wheel $e^2$, so that as the said sprocket wheel is moved forward or backward by the adjusting screws z (Fig. 3) to tighten or slacken the chains carrying the trays, the stop $h^4$ always maintains the same relative position thereto and guides the trays correctly on to the projecting rims or ledges m of the sprocket wheel $e^2$, and the further revolution of the wheel then causes these projecting ledges owing to their special shape (as illustrated in the accompanying drawings) to tilt the trailing edge of each tray above the line of the top horizontal stretch of trays, as shown at 8 in Fig. 1, and thereby reverse the overlap of the edge of the tray from what it was in the said top horizontal stretch or web, and the trays are then carried round with the sprocket wheel in this same relative position to one another, until the chain on leaving the wheel, draws the trays forward over the guide j on to the rails d into the horizontal stretch of trays which forms the under or returning web, with the overlap of the leading edge of each tray on top of the trailing edge of the tray in front of it. Then at the opposite end of the under web before the trays ascend back to the top stretch of the endless web, the trailing end of each successive tray on reaching the point g drops against the adjustable stop k, but only to a sufficient angle to partially discharge its contents, as already described in respect of the trays of the top web, and after traveling clear of stop k, it then drops into a vertical position against the stop $k^2$ and discharges the remainder of its contents over the apron $k^3$, after which the chain draws the tray again into a horizontal position over the horizontal supporting ledge of the stop $k^2$, the length of which must be such that the pivot of the tray should have just cleared its rear end as the tray following reaches its front end, whereupon the nose or point n of the projecting ledges $n^2$ of the sprocket wheel bears down on the leading end of the tray or its end holders, and presses it down past the rear end of the stop $k^2$, and thereby tilts the trailing end of the tray up clear of the leading end of the tray following into the position shown at 9 in Fig. 1, which reverses the overlap of their edges and the trays are then held in this same relative position to one another by the projecting parts n of the ledges $n^2$ while passing round the sprocket wheel, so that when drawn by the chain on to the other top rails d, the overlap of the leading end of the tray is on top of the trailing end of the tray preceding it.

In the lower or returning stretch of trays in the lowest of the endless webs, the dropping tray discharges its entire load of material by one single drop into the discharge chute o, whence it is delivered out of the machine by the discharging wheel, which is constructed in compartments, as shown in Fig. 1 to prevent the current or any passage of air either into or out of the machine, according to whether it is being worked by means of a partial vacuum or pressure of air in the compartment below the trays. In the drying apparatus illustrated, the hot air is introduced at the top of the machine, and the exhaust air drawn away from below, by an exhaust fan, but when preferred the heated air may be introduced under pressure below the trays, or drawn up through them by an exhaust fan operating from above them.

The feed inlet to the machine, for the material to be dried, may be fitted with any suitable feeding or spreading apparatus for supplying the upper endless band with a regular quantity of such material. The means shown consist of an endless band of flat laths $s$ carried upon chains running on sprocket wheels $s^2$ one of which may be driven by means of a chain $t$ (Fig. 2) from the spindle of the upper endless band. The thickness of the material fed into the machine is indicated by the inlet door $u$, which may be raised or lowered by means of the worm gear $u^2$. $p$ $p$ are doors for examining the various parts of the interior of the machine. $q$ is the hot air supply duct, and $r$ the opening to the exhaust fan.

In case the machine were by mistake started with the driving pulley rotating in the wrong direction, some damage to the trays might ensue. To render this impossible the driving pulley is fitted with a clutch illustrated in Fig. 7, in which $v$ is the driving pulley running loose on the shaft $v^2$. $w$ is a clutch keyed on the shaft $v^2$ but free to slide in and out of gear, and kept in gear with the driving pulley by the spring $x$. It is obvious that the clutch can only drive the machine in one direction, and that if the driving pulley be rotated in the opposite direction to that in which the clutch is intended to operate, it comes out of gear, by compressing the spring back along the driving shaft. $y$ is the shaft bearing.

The hereinbefore described method of reversing the overlap of the edges of the trays in passing round the sprocket wheels from the upper to the lower surface of the endless webs, and vice versa, is so certain and positive in its action that no obstruction of any ordinary nature can prevent the operation taking place, nor does a high speed of drive, nor any sudden variations in the speed affect its efficiency. Hence the invention will prove of public utility.

What I claim, and desire to secure by Letters Patent, is—

1. In apparatus for drying or treating tea or other substances, stretches of endless webs consisting of a series of pivoted trays, each having its leading edge overlapping the trailing edge of the next, so that each can drop freely to discharge its contents, conveying chains to which said trays are pivoted, sprocket wheels over which said chains run, and means normally holding said trays against dropping and freeing them at a predetermined point, in combination with a series of ledges, revolving with said sprocket wheels, engaging successively the successive trays before they are led around the sprocket wheel, revolving with the trays, projecting the trailing edge of each tray above the leading edge of the tray following, and retaining each tray in that position while passing round with the sprocket wheel, whereby when the chain carries each tray from one to the next stretch of the web, its trailing edge is again underneath the leading edge of the tray following, substantially as and for the purpose set forth.

2. In apparatus for drying or treating substances, an endless traveling web consisting of pivoted tilting trays which tilt on their pivots near the end of each stretch of said web, to discharge their contents in the manner set forth, and means normally holding said trays against tilting, and freeing them at a predetermined point, in combination with a plurality of successive stops near the end of said stretch, engaging successively the successive trays when they tilt, the first of said successive stops limiting the extent of the tilting of the trays to an inclined position, and the last of said successive stops allowing them to drop to a substantially vertical position, substantially as and for the purpose set forth.

3. In apparatus for drying or treating substances, an endless traveling web consisting of pivoted tilting trays which tilt on their pivots near the end of each stretch of said web, to discharge their contents in the manner set forth, and means normally holding said trays against tilting, and freeing them at a predetermined point, in combination with an adjustable stop engaging said trays successively when they tilt, and limiting the extent of the tilting of the trays, and means for adjusting said stop, whereby said stop can be adjusted and thereby the angle to which the trays tilt can be regulated, substantially as and for the purpose set forth.

In witness whereof I have hereunto signed my name in the presence of two subscribing witnesses.

SAMUEL CLELAND DAVIDSON.

Witnesses:
  R. M. SPEARPOINT,
55 *Chancery Lane, London.*
  T. F. BARNES,
17 *Gracechurch Street, London, E. C.*